(12) United States Patent
Jang

(10) Patent No.: US 11,542,834 B2
(45) Date of Patent: Jan. 3, 2023

(54) RING SEGMENT AND TURBOMACHINE INCLUDING SAME

(71) Applicant: DOOSAN ENERBILITY CO., LTD, Changwon (KR)

(72) Inventor: Yun Chang Jang, Gimhae (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/568,837

(22) Filed: Jan. 5, 2022

(65) Prior Publication Data

US 2022/0268173 A1 Aug. 25, 2022

(30) Foreign Application Priority Data

Feb. 23, 2021 (KR) .................. 10-2021-0024022

(51) Int. Cl.
*F01D 25/14* (2006.01)
*F01D 25/24* (2006.01)

(52) U.S. Cl.
CPC .............. *F01D 25/14* (2013.01); *F01D 25/24* (2013.01); *F05D 2240/11* (2013.01);
(Continued)

(58) Field of Classification Search
CPC .......... F01D 11/08; F01D 25/12; F01D 25/14; F01D 25/24; F05D 2220/31;
(Continued)

(56) References Cited

U.S. PATENT DOCUMENTS 6,155,778 A * 12/2000 Lee .................. F01D 11/08
415/173.1
6,196,792 B1 * 3/2001 Lee .................. F01D 25/12
415/176
(Continued)

FOREIGN PATENT DOCUMENTS

EP 1375824 A1 1/2004
EP 2860358 A1 4/2015
(Continued)

OTHER PUBLICATIONS

EP Office Action dated Aug. 5, 2022.
KR Office Action dated Aug. 29, 2022.

*Primary Examiner* — Igor Kershteyn
(74) *Attorney, Agent, or Firm* — Harvest IP Law LLP

(57) ABSTRACT

A ring segment and a turbomachine including the ring segment are provided. The ring segment installed on an inner circumferential surface of a casing and disposed to face an end of a blade disposed inside the casing, the ring segment includes a segment body disposed inside the casing in a radial direction of the casing and including a plurality of cooling channels through which cooling air flows, a pair of segment protrusions protruding outward from the segment body, coupled to the inner circumferential surface of the casing, and spaced apart from each other in a flow direction of fluid flowing through the casing to form an RS cavity into which cooling air is introduced, wherein when the segment body has a cross section along an imaginary plane including a radial straight line of the casing, the cooling channel is formed such that a width in a direction perpendicular to a radial direction of the casing is greater than a width in the radial direction of the casing.

20 Claims, 5 Drawing Sheets

(52) U.S. Cl.
CPC .... *F05D 2240/14* (2013.01); *F05D 2250/184* (2013.01); *F05D 2250/37* (2013.01); *F05D 2250/75* (2013.01); *F05D 2260/232* (2013.01)

(58) Field of Classification Search
CPC ............ F05D 2220/32; F05D 2240/11; F05D 2240/14; F05D 2250/184; F05D 2250/185; F05D 2250/37; F05D 2250/75; F05D 2260/232; Y02T 50/60; Y02E 10/72
See application file for complete search history.

(56) References Cited

U.S. PATENT DOCUMENTS

| | | | |
|---|---|---|---|
| 6,354,795 B1* | 3/2002 | White | F01D 25/14 415/170.1 |
| 2005/0111965 A1* | 5/2005 | Lowe | F01D 9/04 415/116 |
| 2006/0140753 A1 | 6/2006 | Romanov | |
| 2007/0041827 A1 | 2/2007 | Camus | |
| 2012/0057968 A1 | 3/2012 | Lee | |
| 2013/0323033 A1 | 12/2013 | Lutjen | |
| 2018/0045060 A1* | 2/2018 | Matsuo | F01D 9/02 |

FOREIGN PATENT DOCUMENTS

| | | |
|---|---|---|
| EP | 3318720 A1 | 5/2018 |
| WO | 95-27126 A1 | 10/1995 |

\* cited by examiner

RING SEGMENT AND TURBOMACHINE INCLUDING SAME

CROSS REFERENCE TO RELATED APPLICATION

This application claims priority to Korean Patent Application No. 10-2021-0024022, filed on Feb. 23, 2021, the disclosure of which is incorporated herein by reference in its entirety.

BACKGROUND

1. Field

Apparatuses and methods consistent with exemplary embodiments relate to a ring segment and a turbomachine including the same, and more particularly, to a ring segment installed on an inner circumferential surface of a casing and disposed to face an end of a blade installed in the casing, and a turbomachine including the same ring segment.

2. Description of the Related Art

A turbomachine refers to a device that generates a driving force used to generate electric power with fluid (e.g., gas) passing through the turbomachine. Therefore, a turbomachine and a generator are usually used together. The turbomachine may include gas turbines, steam turbines, wind power turbines, and the like. A gas turbine mixes compressed air and natural gas and burns the mixture to generate combustion gas that is used to generate a driving force for the generation of electric power. A steam turbine heats water to generate steam that is used to generate a driving force for the generation of electric power. A wind turbine converts wind power into a driving force for the generation of electric power.

The gas turbine includes a compressor section, a combustor section, and a turbine section. The compressor section includes a plurality of compressor vanes and a plurality of compressor blades alternately arranged in a compressor casing with an air inlet through which air is introduced. The introduced air is compressed by the compressor vanes and the compressor blades while passing through an inside of the compressor section. The combustor section mixes fuel with the compressed air compressed by the compressor section. In addition, the combustor ignites the fuel-air mixture with an igniter to generate high-temperature and high-pressure combustion gas. The generated combustion gas is supplied to the turbine section. The turbine section includes a plurality of turbine vanes and a plurality of turbine blades alternately arranged in a turbine casing. The combustion gas generated by the combustor rotates the turbine blades while passing through an inside of the turbine section and then is discharged to outside through a turbine diffuser.

The steam turbine includes an evaporator and a turbine. The evaporator generates steam by heating water supplied from the outside. The turbine of the steam turbine includes a plurality of turbine vanes and a plurality of turbine blades alternately arranged in a turbine casing. While the gas turbine uses the combustion gas the steam turbine uses the steam generated by the evaporator to rotate the turbine blades.

The turbine includes a turbine stator and a turbine rotor which is installed in the turbine stator. Here, the turbine stator includes a turbine casing, turbine vanes coupled to an inner circumferential surface of the turbine casing, and a ring segment coupled to the inner circumferential surface of the turbine casing and disposed between adjacent turbine vanes in a flow direction of combustion gas or steam. The turbine rotor includes a turbine disk and turbine blades coupled to an outer circumferential surface of the turbine disk.

Ring segments are installed in the turbine to prevent a leakage of high-temperature and high-pressure combustion gas which rotates the rotor and consequently enhances the efficiency of the gas turbine. To prevent the ring segments from being damaged by the heat of the combustion gas or steam flowing through the turbine casing, each of the ring segments includes a cooling channel through which cooling air flows. However, because the cooling channels of related art ring segments have a circular cross section, it is difficult to effectively dissipate the heat transferred to the ring segments from high-temperature combustion gas or steam flowing radially inward of the ring segments.

SUMMARY

Aspects of one or more exemplary embodiments provide a ring segment having cooling channels of different cross-sections so that heat transferred to the ring segment from high-temperature combustion gas or steam can be effectively dissipated, and a turbomachine including the same ring segment.

Additional aspects will be set forth in part in the description which follows and, in part, will become apparent from the description, or may be learned by practice of the exemplary embodiments.

According to an aspect of an exemplary embodiment, there is provided a ring segment installed on an inner circumferential surface of a casing and disposed to face an end of a blade disposed inside the casing, the ring segment including: a segment body disposed inside the casing in a radial direction of the casing and including a plurality of cooling channels through which cooling air flows; and a pair of segment protrusions protruding outward from the segment body, coupled to the inner circumferential surface of the casing, and spaced apart from each other in a flow direction of fluid flowing through the casing to form an RS cavity through which cooling air flows. When the segment body has a cross section along an imaginary plane including a radial straight line of the casing, the cooling channel is formed such that a width in a direction perpendicular to a radial direction of the casing is greater than a width in the radial direction of the casing.

According to an aspect of another exemplary embodiment, there is provided a turbo machine including: a stator comprising a casing through which fluid passes, a vane coupled to an inner circumferential surface of the casing to guide the fluid, and a ring segment installed on the inner circumferential surface of the casing and disposed between vanes adjacent to each other in a flow direction of the fluid; and a rotor comprising a disk installed inside the stator and a blade coupled to an outer circumferential surface of the disk and rotated by the fluid. The ring segment includes: a segment body disposed inside the casing in a radial direction of the casing and having a plurality of channels through which cooling air flows; a pair of segment protrusions protruding outward from the segment body, coupled to the inner circumferential surface of the casing, and spaced from each other in a flow direction of the fluid flowing through the casing to form an RS cavity into which the cooling air is introduced. When the segment body has a cross section along an imaginary plane including a radial straight line of the casing, the cooling channel is formed such that a width in a direction perpendicular to a radial direction of the casing is greater than a width in the radial direction of the casing.

The plurality of cooling channels may include: a plurality of first cooling channels passing through a downstream end of the segment body in the flow direction of the fluid flowing through the casing, extending upstream from the downstream end of the segment body, and extending in a reverse direction downstream from an upstream side of the segment body; and a plurality of second cooling channels alternately disposed with the plurality of first cooling channels, passing through an upstream end of the segment body in the flow direction of the fluid flowing through the casing, extending downstream from the upstream end of the segment body, and extending in a reverse direction upstream from a downstream side of the segment body.

The cooling channel may be formed to extend along the flow direction of the fluid flowing through the casing and includes a plurality of curved portions bent in circumferential direction of the casing.

The plurality of curved portions may include a plurality of first bent portions bent in a first circumferential direction of the circumferential directions of the casing and a plurality of second bent portions alternately arranged with the plurality of first bent portions and bent in a second circumferential direction different from the first circumferential direction.

The cooling channel may include a U-shaped return portion in which a fluid changes a flow direction thereof so that the fluid flows to a second curved portion of the plurality of curved portions from a first curved portion of the plurality of curved portions, wherein the first curved portion and the second curved portion are adjacent to each other in the circumferential direction.

The cooling channel may include: an inlet connected to one of the curved portions to receive cooling air from the RS cavity and through which the received cooling air flows into the plurality of curved portions; and an outlet connected to one of the curved portions to communicate with the outside of the segment body and through which the cooling air flowing through the plurality of curved portions is discharged downstream or upstream in the flow direction of the fluid flowing through the casing.

In a cross-section of the segment body when viewed along the circumferential direction of the casing, the curved portion may be formed such that a width $W_D$ in the flow direction of the fluid flowing through the casing is greater than a width $W_R$ in the radial direction of the casing.

In a cross-section of the segment body when viewed along the flow direction of the fluid flowing through the casing, the curved portion may be formed such that a width We in the circumferential direction of the casing is greater than a width $W_R$ in the radial direction of the casing.

Each of first cooling channel and the second cooling channel may include an inlet through which the cooling air introduced into the RS cavity is supplied, and the inlet of the first cooling channel and the inlet of the second cooling channel may be disposed adjacent to each other in the flow direction of the fluid flowing through the casing.

The segment body may be disposed outside the plurality of cooling channels in the radial direction and include a cooling cavity into which the cooling air is introduced from the RS cavity and through which the cooling air is supplied to the plurality of cooling channels, and the cooling cavity may be divided into a first cooling cavity communicating with the first cooling channel and a second cooling cavity communicating with the second cooling channel by a partition wall installed therein.

According to the ring segment according to one or more exemplary embodiments, when the ring segment is cut along an imaginary plane including a radial straight line of the turbine casing, the cross section of the cooling channel is formed such that a size in the radial direction of the turbine casing is greater than a size in the direction perpendicular to the radial direction of the casing. Therefore, the contact area between the cooling air introduced into the cooling channel and the inner wall surface of the cooling channel in the radial direction is increased. Therefore, it is possible to effectively dissipate the heat transferred to the ring segment from the high-temperature combustion gas or steam flowing through the turbine casing.

In addition, according to the ring segment according to one or more exemplary embodiments, the cooling channel is formed in a meandering shape in which the cooling channel extends along the flow direction of the fluid flowing through the turbine casing and has a plurality of bent portions bent in the circumferential direction of the turbine casing. This structure increases the contact area between the cooling air flowing through the cooling channel and the inner wall surface portion of the cooling channel in the radial direction. Therefore, the efficiency of cooling the ring segment is improved.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
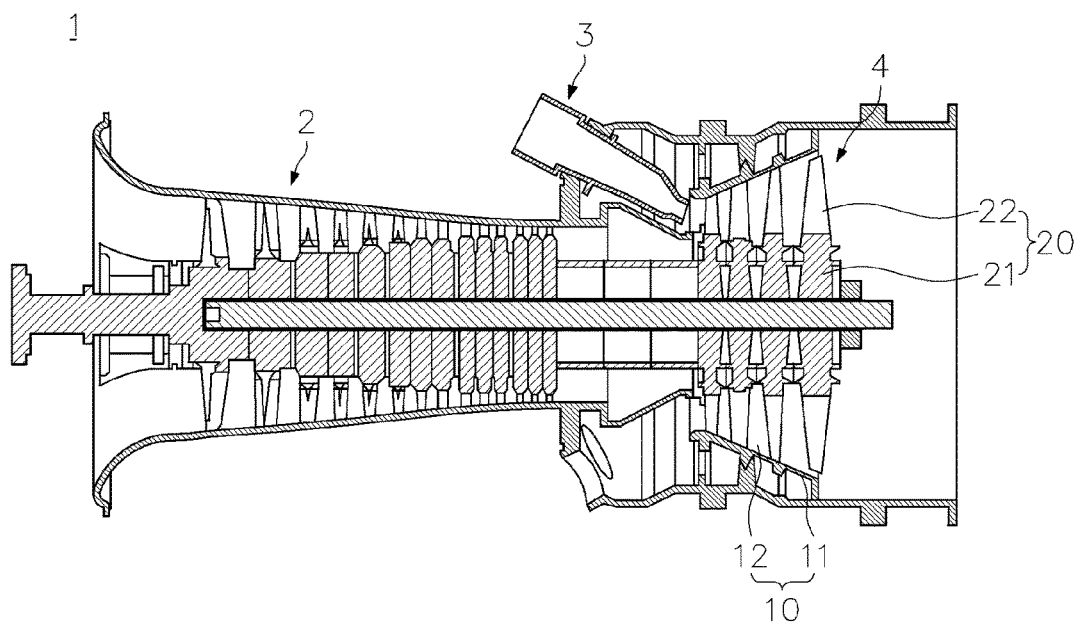
FIG. 1 is a cross-sectional view illustrating a gas turbine according to an exemplary embodiment.

Various changes and various embodiments will be described in detail with reference to the drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the sprit and technical scope disclosed herein.

The terminology used herein is for the purpose of describing specific embodiments only, and is not intended to limit the scope of the disclosure. The singular expressions "a", "an", and "the" may include the plural expressions as well, unless the context clearly indicates otherwise. In the disclosure, the terms such as "comprise", "include", "have/has" should be construed as designating that there are such features, integers, steps, operations, components, parts, and/or combinations thereof, not to exclude the presence or possibility of adding one or more other features, integers, steps, operations, components, parts and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, a ring segment and a turbomachine including the ring segment will be described with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, some components in the accompanying drawings are exaggerated, omitted, or schematically illustrated.

FIG. 1 is a cross-sectional view illustrating a gas turbine according to an exemplary embodiment. Referring to FIG. 1, a gas turbine 1 includes a compressor 2, a combustor 3, and a turbine 4. In a flow direction of gas (for example, compressed air or combustion gas), the compressor 2 is disposed on an upstream side of the gas turbine 1 and the turbine 4 is disposed on a downstream side of the gas turbine 1. The combustor 3 is disposed between the compressor 2 and the turbine 4.

The compressor 2 includes compressor vanes and compressor rotors in a compressor casing. The turbine 4 includes turbine vanes 12 and turbine rotors 20 in a turbine casing 11. The compressor vanes and the compressor rotors are arranged in multiple stages along the flow direction of compressed air, and the turbine vanes 12 and the turbine rotors 20 are also arranged in multiple stages along the flow direction of combustion gas. The compressor 2 has an internal space of which a volume decreases from a front stage to a rear stage so that the introduced air can be compressed while passing through the inside of the compressor 11, whereas the turbine 4 has an internal space of which a volume increases from a front stage to a rear stage so that the combustion gas supplied from the combustor 3 can expand while passing through the inside of the turbine 4.

In addition, a torque tube serving as a torque transmission member is disposed between the last-stage compressor rotor of the compressor 2 and the first-stage turbine rotor of the turbine 4 to transfer the torque generated by the turbine 4 to the compressor 2. Although the torque tube may include a plurality of torque tube disks arranged in three stages as illustrated in FIG. 1, this is only an example, and the torque tube may include torque tube disks arranged in four or more stages or two or less stages.

The compressor rotor includes a compressor disk and a plurality of compressor blades. A plurality of compressor disks may be disposed in the compressor casing, and each of the compressor disks is fastened by a tie road so as not to be separated from each other in an axial direction of the compressor. That is, the compressor disks are arranged in the axial direction with the tie rod extending through centers of the compressor disks. In addition, adjacent compressor disks are arranged such that opposing surfaces of the adjacent compressor disks are pressed against each other by the tie rod so that the compressor disks cannot rotate relative to each other.

The plurality of compressor blades are radially coupled to an outer surface of each of the compressor disks along a circumferential direction of the compressor disk. For each compressor stage, the plurality of compressor vanes are coupled to an inner surface of the compressor casing in the circumferential direction are alternately arranged with the plurality of compressor blades. While the compressor disks rotate along with a rotation of the tie rod, the compressor vanes fixed to the compressor casing do not rotate. The compressor vanes align the flow of compressed air passing through the compressor blades and guide the flow of the compressed air moved from front-stage compressor blades to rear-stage compressor blades. Here, the compressor casing and the compressor vanes may be collectively defined as a compressor stator to be distinguished from the compressor rotor.

The tie rod is installed to extend through the centers of the plurality of compressor disks and the plurality of turbine disks such that one end of the tie rod is fastened to the compressor disk located on the foremost end side of the compressor, and the other end thereof is fastened by a fixing nut.

Because the tie rod may be formed in various structures according to a type of a gas turbine, a shape of the tie rod is not limited to the example illustrated in FIG. 1. There are three types of tie rod including a single-type in which a single tie rod extends through the centers of the compressor disks and the turbine rotor disks; a multi-type in which multiple tie rods are arranged in a circumferential direction; and a complex type in which the single-type and the multi-type are combined.

Also, the compressor may include a deswirler serving as a guide blade. The deswirler increases a pressure of fluid flowing into the combustor and adjusts a flow angle of the fluid to be substantially equal to the designed flow angle.

The combustor 3 mixes the introduced compressed air with fuel and burns the air-fuel mixture to produce high-temperature and high-pressure combustion gas, thereby raising the temperature of the combustion gas to a heat-resistant temperature at which components of the combustor and components of the turbine can endure through an isothermal combustion process.

A plurality of combustors constituting the combustor 3 may be arranged in a form of a cell in a combustor casing. Each combustor 3 includes a nozzle for injecting fuel, a liner defining a combustion chamber, and a transition piece connecting the combustion chamber and the turbine.

The liner defines the combustion chamber in which the fuel injected through the fuel injection nozzle and the compressed air fed from the compressor are mixed and burned. That is, the liner includes the combustion chamber in which the fuel-air mixture is combusted and a liner annular flow passage that surrounds the combustion chamber to provide an annular space. The nozzle for injecting fuel is installed in a front end of the liner, and an igniter is installed in a side wall of the liner.

In the liner annular flow passage, compressed air introduced through a plurality of holes formed in an outer wall of the liner flows, and the introduced compressed air cools the liner while flowing toward the transition piece. Because the compressed air flows along the outer surface of the liner, it is possible to prevent the liner from being thermally damaged by high temperature combustion gas.

The transition piece is coupled to the rear end (i.e., downstream end) of the liner to deliver the combustion gas to the turbine. The transition piece has a transition piece annular flow passage surrounding an inner space of the transition piece, and compressed air flowing through the transition piece annular flow passage cools an outer surface of the transition piece, thereby preventing the transition piece from being thermally damaged by high temperature combustion gas.

The high-temperature and high-pressure combustion gas supplied to the turbine 4 expands while passing through the inside of the turbine 4. The expansion of the combustion gas causes impulse and reaction forces with respect to the turbine blades 22, thereby generating torque. The torque is transferred to the compressor through the torque tube, and an excessive portion of the torque exceeding the power required to driving the compressor is used to drive a generator or the like.

The turbine 4 is similar in structure to the compressor 2. That is, the turbine 4 includes a plurality of turbine rotors 20 similar to the compressor rotors of the compressor 2. Each turbine rotor 20 includes a turbine disk 21 and a plurality of turbine blades 22 radially coupled to an outer surface of the turbine disk 21. The turbine disk 21 and the plurality of turbine blades 22 are designed in a structure in which they are arranged in a multi-stage to be spaced apart from each other along a flow direction of the combustion gas. A plurality of turbine vanes 12 are radially coupled to the inner surface of the turbine casing 11 along the circumferential direction such that each stage of turbine vanes 12 is disposed between adjacent stages of the turbine blades 22 to guide the flow direction of the combustion gas passing through the turbine blades 22. Here, the turbine casing 11 and the turbine vanes 12 may be collectively defined as a turbine stator 10 to distinguish them from the turbine rotor 20.

Figure 2:
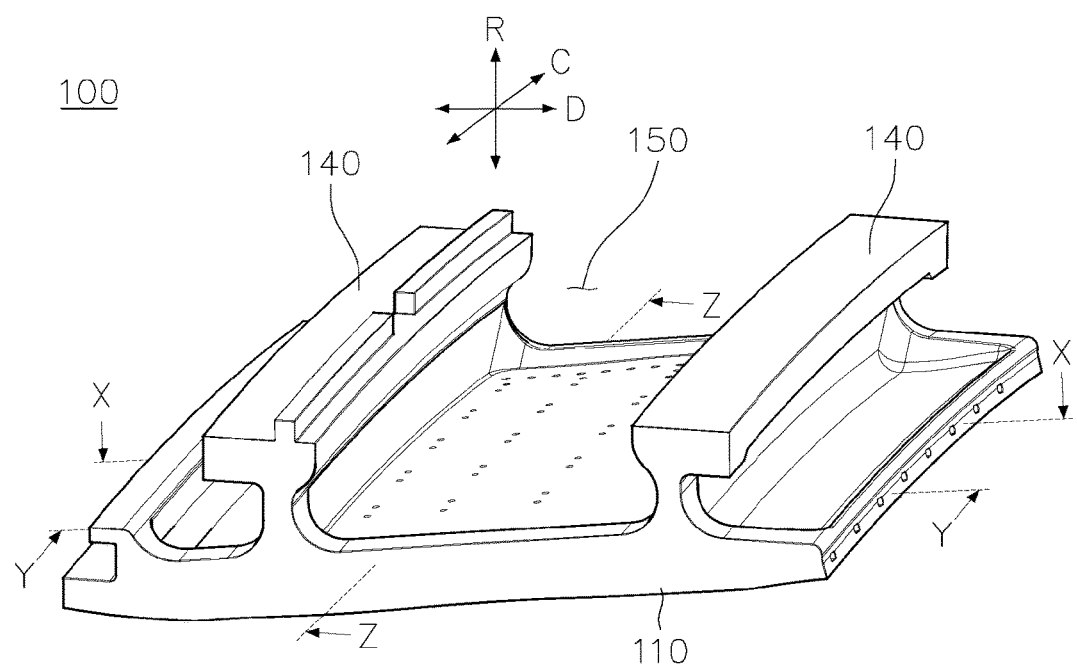
FIG. 2 is a perspective view of a ring segment according to an exemplary embodiment.
Figure 3:
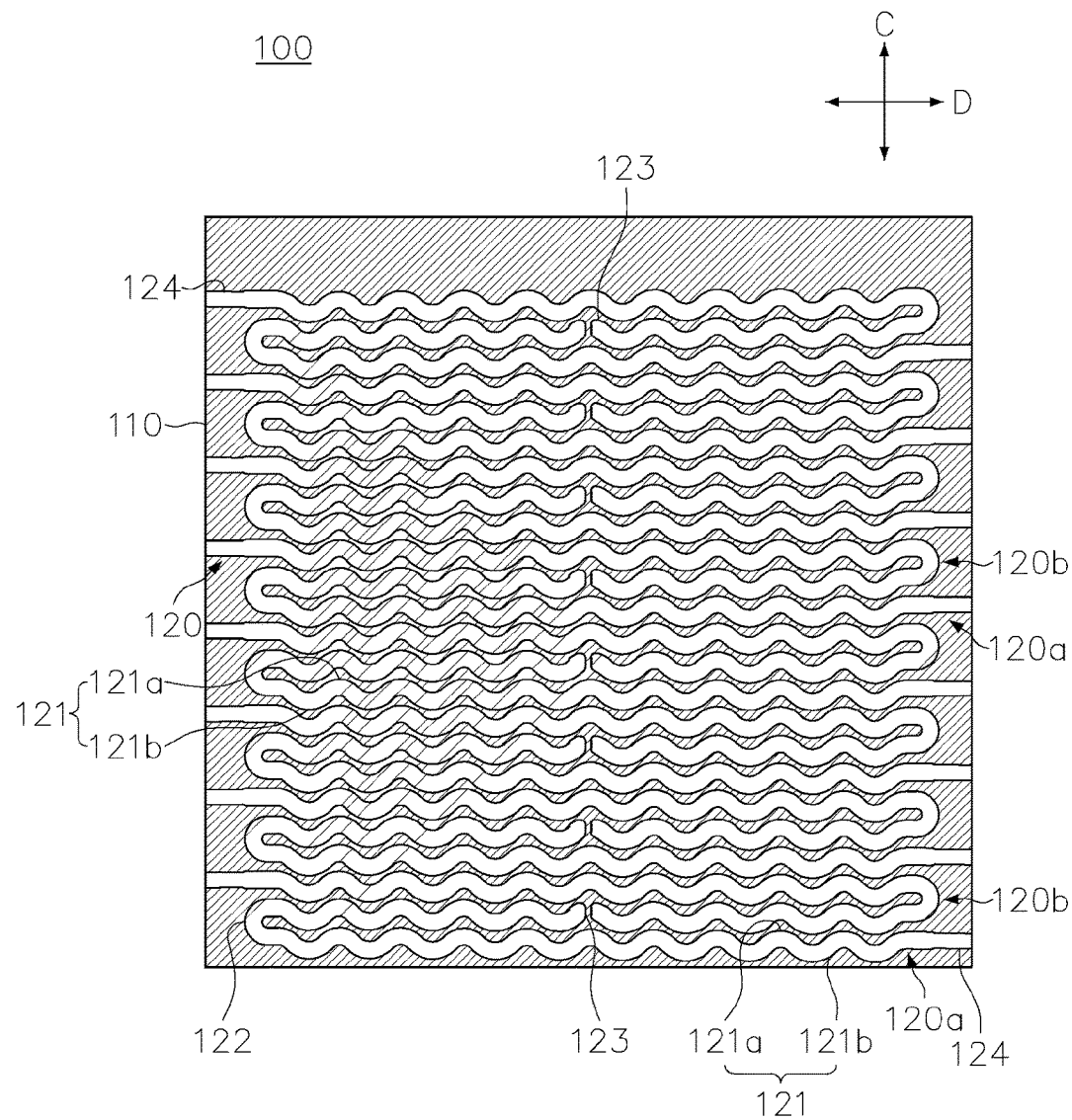
FIG. 3 is a cross-sectional view taken along line X-X of FIG. 2.
Figure 4:
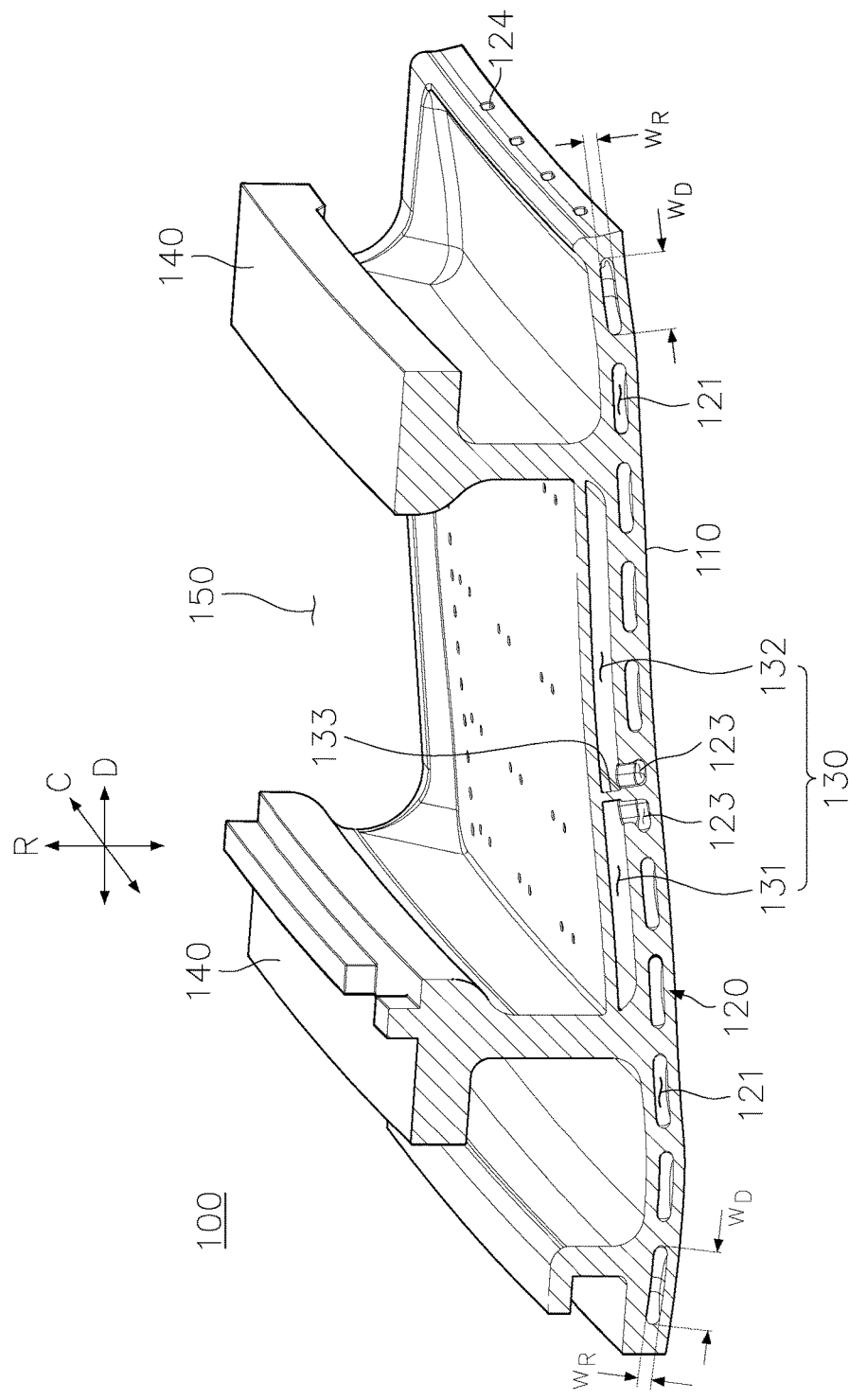
FIG. 4 is a perspective view of the ring segment partially cut along line Y-Y of FIG. 2.
Figure 5:
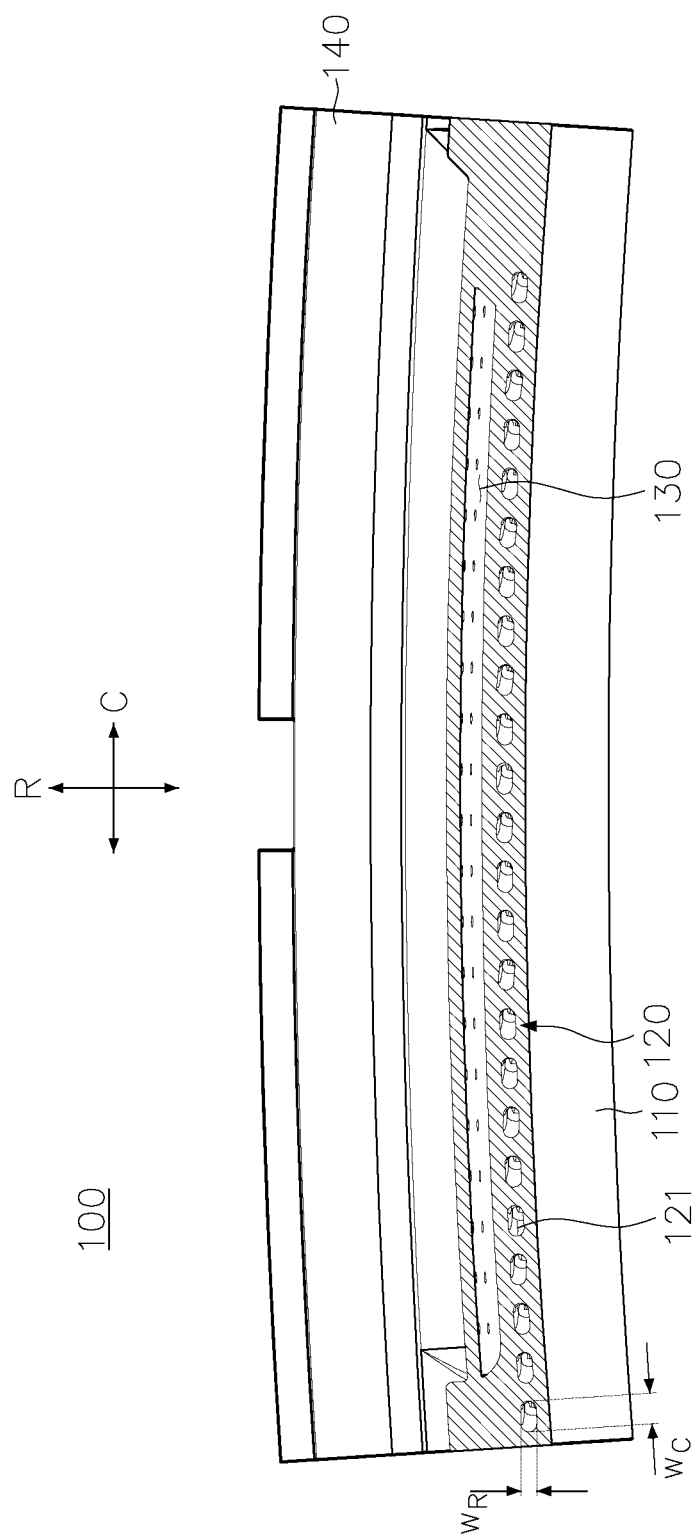
FIG. 5 is a cross-sectional view taken along line Y-Y of FIG. 2.

FIG. 2 is a perspective view of a ring segment according to an exemplary embodiment. FIG. 3 is a cross-sectional view taken along line X-X of FIG. 2. FIG. 4 is a perspective view of the ring segment partially cut along line Y-Y of FIG. 2. FIG. 5 is a cross-sectional view taken along line Y-Y of FIG. 2.

Hereinafter, for convenience of description, reference character C denotes a circumferential direction of the turbine casing 11, reference character R denotes a radial direction of the turbine casing 11, and reference character D denotes a flow direction of fluid flowing through the turbine casing 11. For example, the left side may be an upstream side in the flow direction D of the fluid, and the right side may be a downstream side in the flow direction D of the fluid. If a turbomachine is the gas turbine 1, the fluid flowing along the fluid flow direction D is combustion gas. On the other hand, if the turbomachine is a steam turbine, the fluid flowing along the fluid flow direction D is steam. The fluid flow direction D may be the same as the axial direction of the gas turbine 1 and a longitudinal direction of the tie rod.

Referring to FIGS. 2 to 5, a ring segment 100 is installed in an inner circumferential surface of the turbine casing 11 and is disposed to face an end of the turbine blade 22 disposed inside the turbine casing 11. The ring segment 100 includes a segment body 110 and two segment protrusions 140.

The segment body 110 is formed in a plate shape that is bent further outward in the radial direction R toward the downstream side in the flow direction D. The segment body 110 has a plurality of cavities and channels formed therein so that cooling air flows through the cavities and the channels. The cooling air may be compressed air supplied from the compressor 2 or air supplied from an air source disposed outside the gas turbine 1. The segment protrusions 140 protrude outward in the radial direction R of the segment body 110 and are coupled to the inner circumferential surface of the turbine casing 11. The segment protrusions 140 are spaced apart from each other in the flow direction D to form an RS cavity 150 therebetween. For example, the segment protrusions 140 are formed in an upstream portion and a downstream portion in the flow direction D, respectively.

Referring to FIG. 4, a plurality of cooling channels 120 are disposed relatively inside in the radial direction R of the ring segment 100. Accordingly, the cooling air flowing through the plurality of cooling channels 120 cools the inner portion of the ring segment 100 in the radial direction R of the ring segment 100 heated by the combustion gas. The cooling cavity 130 is disposed outside the plurality of cooling channels 120 in the radial direction R. Accordingly, the cooling air supplied to the RS cavity 150 first flows into the plurality of cooling channels 120 through the cooling cavity 130.

Referring to FIG. 3, the plurality of cooling channels 120 may include first cooling channels 120a and second cooling channels 120b. Each of the first cooling channels 120a may pass through a downstream end of the segment body 110, extend to an upstream side of the segment body 110, and then return to a downstream side. Each of the second cooling channels 120b may pass through an upstream end of the segment body 110, extend to the downstream side of the segment body 110, and then return to the upstream side. The first cooling channels 120a and the second cooling channels 120b may be alternately arranged in the circumferential direction C.

One cooling channel 120 has a meandering shape and includes a plurality of curved portions 121, a plurality of return portions 122, a plurality of inlets 123, and a plurality of outlets 124.

The plurality of curved portions 121 are sequentially and continuously arranged in the flow direction D and are curved (or bent) in the circumferential direction C. The plurality of curved portions 121 may include first bent portions 121a and second bent portions 121b. The first bent portions 121a and the second bent portions 122b are alternately disposed in the flow direction D and are formed to be oppositely bent in the circumferential directions C. The circumferential direction C include a clockwise direction and a counterclockwise direction. If the first bent portions 121a are bent in the clockwise direction, the second bent portions 121b are bent in the counterclockwise direction.

The return portion 122 is a U-shaped curved portion and is disposed adjacent to a downstream end or an upstream end of the segment body 110. The return portion 122 guides the fluid flowing through one of the curved portions 121 to the next curved portion 121 adjacent to the preceding curved portion 121 in the circumferential direction C. That is, the return portion 122 is a portion in which the fluid changes direction. The return portion 122 of the first cooling channel 120a is disposed on the upstream side. The return portion 122 of the second cooling channel 120b is disposed on the upstream side.

The inlet 123 is connected to the curved portion 121 and connected to the cooling cavity 130. Accordingly, the cooling air introduced into the cooling cavity 130 from the RS cavity 150 is introduced into the curved portion 121 through the inlet 123. The outlet 124 is connected to the curved portion 121 and communicates with the outside of the segment body 110. The cooling air flowing through the plurality of curved portions 121 is discharged from the upstream end or the downstream end of the segment body 110. That is, the cooling air sequentially flows through the RS cavity 150, the cooling cavity 130, the inlet 123, the multiple curved portions 121, the return portion 122, the multiple curved portions 121, and the outlet 124 in this order.

Referring to FIGS. 4 and 5, when the segment body 110 is cut along in an imaginary plane including a straight line extending in the radial direction R, the cross section of the cooling channel 120 is formed such that a width $W_R$ in the radial direction is smaller than a width $W_C$ in the circumferential direction C perpendicular to the radial direction R, and is smaller than a width $W_D$ in the flow direction D perpendicular to the radial direction R.

Referring to FIG. 4 based on the cross section of the segment body 110 when viewed in the circumferential direction C, the curved portion 121 is formed such that the width $W_D$ in the flow direction D is larger than the width $W_R$ in the radial direction R. Referring to FIG. 5 based on the cross section of the segment body 110 when viewed in the upstream direction of the flow direction D, the curved portion 121 is formed such that the width $W_C$ in the circumferential direction C is larger than the width $W_R$ in the radial direction R.

In this case, the widths $W_C$ and $W_D$ of the cooling channel 120 in the directions C and D perpendicular to the radial direction R are larger than the width $W_R$ in the radial direction R, so that the contact area between the cooling air introduced into the cooling channel 120 and the inner wall surface portion of the cooling channel 120 in the radial direction R is increased. Therefore, according to the exemplary embodiment, it is possible to effectively dissipate the heat transferred to the ring segment 100 from the high-temperature combustion gas or steam flowing through the turbine casing 11.

In addition, according to the ring segment 100 according to the exemplary embodiment, the cooling channel is formed in a meandering shape having a plurality of curved portions that extend along the flow direction of the fluid flowing through the turbine casing and are bent in the circumferential direction of the turbine casing. This structure also increases the contact area between the cooling air flowing through the cooling channel and the inner wall surface portion of the cooling channel in the radial direction R, thereby improving the efficiency of cooling the ring segment.

Referring to FIG. 3, the inlet 123 of the first cooling channel 120a and the inlet 123 of the second cooling channel 120b are disposed adjacent to each other along the flow direction D. Each of the first cooling channel 120a and the second cooling channel 120b has two cooling channels adjacent in the circumferential direction C, and a length of one cooling channel in the flow direction D is smaller than a length of the other cooling channel in the flow direction D. Therefore, when the inlet 123 of the first cooling channel 120a and the inlet 123 of the second cooling channel 120b are arranged adjacent to each other in the flow direction D, the short cooling channel of the first cooling channel 120a and the short cooling channel of the second cooling channel 120b are positioned on the same line in the flow direction D. In this case, the plurality of first cooling channels 120a and the plurality of second cooling channels 120b can be formed more densely in one segment body 110. Therefore, the segment body 110 can be cooled more effectively.

Referring to FIGS. 3 and 4, the cooling cavity 130 may be divided into a first cooling cavity 131 and a second cooling cavity 132 by a partition wall 133 disposed in the cooling cavity 130. The first cooling cavity 131 is disposed on the upstream side of the partition wall 133, and the second cooling cavity 132 is disposed on the downstream side of the partition wall 133. In addition, the inlet 123 of each of the plurality of first cooling channels 120a is connected to the first cooling cavity 131, and the inlet 123 of each of the plurality of second cooling channels 120b is connected to the second cooling cavity 132. Accordingly, the cooling air introduced into the first cooling cavity 131 through the RS cavity 150 flows into the plurality of first cooling channels 120a to cool the segment body 110, and the cooling air introduced into the second cooling cavity 132 through the RS cavity 150 flows into the plurality of second cooling channels 120b to cool the segment body 110.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A ring segment installed on an inner circumferential surface of a casing and disposed to face an end of a blade disposed inside the casing, the ring segment comprising:
   a segment body disposed inside the casing in a radial direction of the casing and including a plurality of cooling channels through which cooling air flows; and
   a pair of segment protrusions protruding outward from the segment body, coupled to the inner circumferential surface of the casing, and spaced apart from each other in a flow direction of fluid flowing through the casing to form an RS cavity through which cooling air flows,
   wherein when the segment body has a cross section along an imaginary plane including a radial straight line of the casing, the cooling channel is formed such that a width in a direction perpendicular to a radial direction of the casing is greater than a width in the radial direction of the casing.

2. The ring segment according to claim 1, wherein the plurality of cooling channels comprise:
   a plurality of first cooling channels passing through a downstream end of the segment body in the flow direction of the fluid flowing through the casing, extending upstream from the downstream end of the segment body, and extending in a reverse direction downstream from an upstream side of the segment body; and
   a plurality of second cooling channels alternately disposed with the plurality of first cooling channels, passing through an upstream end of the segment body in the flow direction of the fluid flowing through the casing, extending downstream from the upstream end of the segment body, and extending in a reverse direction upstream from a downstream side of the segment body.

3. The ring segment according to claim 1, wherein the cooling channel is formed to extend along the flow direction of the fluid flowing through the casing and includes a plurality of curved portions bent in circumferential direction of the casing.

4. The ring segment according to claim 3, wherein the plurality of curved portions comprise a plurality of first bent portions bent in a first circumferential direction of the circumferential directions of the casing and a plurality of second bent portions alternately arranged with the plurality of first bent portions and bent in a second circumferential direction different from the first circumferential direction.

5. The ring segment according to claim 3, wherein the cooling channel includes a U-shaped return portion in which a fluid changes a flow direction thereof so that the fluid flows to a second curved portion of the plurality of curved portions from a first curved portion of the plurality of curved portions, and
　　wherein the first curved portion and the second curved portion are adjacent to each other in the circumferential direction.

6. The ring segment according to claim 3, wherein the cooling channel comprises:
　　an inlet connected to one of the curved portions to receive cooling air from the RS cavity and through which the received cooling air flows into the plurality of curved portions; and
　　an outlet connected to one of the curved portions to communicate with outside of the segment body and through which the cooling air flowing through the plurality of curved portions is discharged downstream or upstream in the flow direction of the fluid flowing through the casing.

7. The ring segment according to claim 3, wherein in a cross-section of the segment body when viewed along the circumferential direction of the casing, the curved portion is formed such that a width $W_D$ in the flow direction of the fluid flowing through the casing is greater than a width $W_R$ in the radial direction of the casing.

8. The ring segment according to claim 3, wherein in a cross-section of the segment body when viewed along the flow direction of the fluid flowing through the casing, the curved portion is formed such that a width $W_C$ in the circumferential direction of the casing is greater than a width $W_R$ in the radial direction of the casing.

9. The ring segment according to claim 2, wherein each of the first cooling channel and the second cooling channel includes an inlet through which the cooling air introduced into the RS cavity is supplied, and
　　the inlet of the first cooling channel and the inlet of the second cooling channel are disposed adjacent to each other in the flow direction of the fluid flowing through the casing.

10. The ring segment according to claim 2, wherein the segment body is disposed outside the plurality of cooling channels in the radial direction and includes a cooling cavity into which the cooling air is introduced from the RS cavity and through which the cooling air is supplied to the plurality of cooling channels, and
　　the cooling cavity is divided into a first cooling cavity communicating with the first cooling channel and a second cooling cavity communicating with the second cooling channel by a partition wall installed therein.

11. A turbo machine comprising:
　　a stator comprising a casing through which fluid passes, a vane coupled to an inner circumferential surface of the casing to guide the fluid, and a ring segment installed on the inner circumferential surface of the casing and disposed between vanes adjacent to each other in a flow direction of the fluid; and
　　a rotor comprising a disk installed inside the stator and a blade coupled to an outer circumferential surface of the disk and rotated by the fluid,
　　wherein the ring segment comprises:
　　a segment body disposed inside the casing in a radial direction of the casing and having a plurality of channels through which cooling air flows;
　　a pair of segment protrusions protruding outward from the segment body, coupled to the inner circumferential surface of the casing, and spaced from each other in a flow direction of the fluid flowing through the casing to form an RS cavity into which the cooling air is introduced, and
　　wherein when the segment body has a cross section along an imaginary plane including a radial straight line of the casing, the cooling channel is formed such that a width in a direction perpendicular to a radial direction of the casing is greater than a width in the radial direction of the casing.

12. The turbo machine according to claim 11, wherein the plurality of cooling channels comprise:
　　a plurality of first cooling channels passing through a downstream end of the segment body in the flow direction of the fluid flowing through the casing, extending upstream from the downstream end of the segment body, and extending in a reverse direction downstream from an upstream side of the segment body; and
　　a plurality of second cooling channels alternately disposed with the plurality of first cooling channels, passing through an upstream end of the segment body in the flow direction of the fluid flowing through the casing, extending downstream from the upstream end of the segment body, and extending in a reverse direction upstream from a downstream side of the segment body.

13. The turbo machine according to claim 11, wherein the cooling channel is formed to extend along the flow direction of the fluid flowing through the casing and includes a plurality of curved portions bent in circumferential direction of the casing.

14. The turbo machine according to claim 13, wherein the plurality of cooling channels comprise a plurality of first bent portions bent in a first circumferential direction of the casing and a plurality of second bent portions arranged alternately with the plurality of first bent portions and bent in a second circumferential direction different from the first circumferential direction.

15. The turbo machine according to claim 13, wherein the cooling channel includes a U-shaped return portion in which a fluid changes a flow direction thereof so that the fluid flows to a second curved portion of the plurality of curved portions from a first curved portion of the plurality of curved portions, and
　　wherein the first curved portion and the second curved portion are adjacent to each other in the circumferential direction.

16. The turbo machine according to claim 13, wherein the cooling channels comprise:
　　an inlet connected to one of the curved portions to receive cooling air from the RS cavity and through which the received cooling air flows into the plurality of curved portions; and
　　an outlet connected to one of the curved portions to communicate with outside of the segment body and through which the cooling air flowing through the plurality of curved portions is discharged downstream or upstream in the flow direction of the fluid flowing through the casing.

17. The turbo machine according to claim 13, wherein in a cross-section of the segment body when viewed along the circumferential direction of the casing, the curved portion is formed such that a width $W_D$ in the flow direction of the fluid flowing through the casing is greater than a width $W_R$ in the radial direction of the casing.

18. The turbo machine according to claim 13, wherein in a cross-section of the segment body when viewed along the flow direction of the fluid flowing through the casing, the curved portion is formed such that a width $W_C$ in the circumferential direction of the casing is greater than a width $W_R$ in the radial direction of the casing.

19. The turbo machine according to claim 12, wherein each of the first cooling channel and the second cooling channel includes an inlet through which the cooling air introduced into the RS cavity is supplied, and the inlet of the first cooling channel and the inlet of the second cooling channel are disposed adjacent to each other in the flow direction of the fluid flowing through the casing.

20. The turbo machine according to claim 12, wherein the segment body is disposed outside the plurality of cooling channels in the radial direction and includes a cooling cavity into which the cooling air is introduced from the RS cavity and through which the cooling air is supplied to the plurality of cooling channels, and the cooling cavity is divided into a first cooling cavity communicating with the first cooling channel and a second cooling cavity communicating with the second cooling channel by a partition wall installed therein.

* * * * *